United States Patent
Bennett et al.

(10) Patent No.: US 9,434,911 B2
(45) Date of Patent: Sep. 6, 2016

(54) OILFIELD CLEANER AND CORROSION INHIBITOR COMPRISING A POLYAMINE SULFONIC ACID SALT

(71) Applicant: Ecolab USA Inc., St. Paul, MN (US)

(72) Inventors: Brian Michael Bennett, Sugar Land, TX (US); Sebastian Dennis Mancuso, Rosharon, TX (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

(21) Appl. No.: 15/056,355

(22) Filed: Feb. 29, 2016

(65) Prior Publication Data

US 2016/0177226 A1    Jun. 23, 2016

Related U.S. Application Data

(63) Continuation of application No. 14/321,461, filed on Jul. 1, 2014, now Pat. No. 9,303,236.

(60) Provisional application No. 61/842,194, filed on Jul. 2, 2013.

(51) Int. Cl.
| | |
|---|---|
| *C11D 1/02* | (2006.01) |
| *C11D 1/12* | (2006.01) |
| *C11D 1/22* | (2006.01) |
| *C11D 7/34* | (2006.01) |
| *C11D 3/00* | (2006.01) |
| *C09K 8/54* | (2006.01) |
| *C09K 8/524* | (2006.01) |
| *C10G 75/02* | (2006.01) |
| *C11D 3/34* | (2006.01) |
| *C11D 3/28* | (2006.01) |
| *C11D 3/30* | (2006.01) |
| *C11D 11/00* | (2006.01) |

(52) U.S. Cl.
CPC ............ *C11D 3/0073* (2013.01); *C09K 8/524* (2013.01); *C09K 8/54* (2013.01); *C10G 75/02* (2013.01); *C11D 3/28* (2013.01); *C11D 3/30* (2013.01); *C11D 3/349* (2013.01); *C11D 11/0041* (2013.01); *C09K 2208/32* (2013.01)

(58) Field of Classification Search
CPC ............ C11D 1/02; C11D 1/12; C11D 1/22; C11D 7/34; C11D 3/3463; C11D 3/349; C11D 3/3427; C11D 3/3915; C11D 11/0041
See application file for complete search history.

(56) References Cited

U.S. PATENT DOCUMENTS

| | | | | |
|---|---|---|---|---|
| 4,424,324 | A * | 1/1984 | Throckmorton | C08F 36/06 526/220 |
| 7,057,050 | B2 | 6/2006 | Meyer | |
| 7,951,754 | B2 | 5/2011 | Tiwari et al. | |
| 2003/0013893 | A1 | 1/2003 | Meyer | |
| 2005/0197275 | A1 * | 9/2005 | Hsu | C11D 1/008 510/445 |
| 2006/0211596 | A1 * | 9/2006 | Hsu | C11D 3/3723 510/499 |
| 2006/0223739 | A1 | 10/2006 | Zhu et al. | |
| 2009/0149356 | A1 | 6/2009 | Tiwari et al. | |
| 2012/0190592 | A1 | 7/2012 | Halim et al. | |
| 2013/0056204 | A1 | 3/2013 | McDaniel et al. | |
| 2013/0137608 | A1 | 5/2013 | Chang et al. | |

OTHER PUBLICATIONS

Dow technical data sheet, "Heavy Polyamine X", 2 pages <http://www.dow.com/amines/prod/ethyl-hpax.htm>.
Huntsman brochure, 2007, "Ethyleneamines", 65 pages.
International Search Report and Written Opinion issued for PCT/US2014/045118, dated Oct. 22, 2014, 13 pages.

* cited by examiner

*Primary Examiner* — Charles Boyer
(74) *Attorney, Agent, or Firm* — Senniger POwers LLP

(57) ABSTRACT

Disclosed herein are cleaner/corrosion inhibiting compositions useful in applications relating to the production, transportation, storage, and separation of crude oil and natural gas. Also disclosed herein are methods of using the compositions as cleaners/corrosion inhibitors, particularly in applications relating to the production, transportation, storage, and separation of crude oil and natural gas.

20 Claims, 2 Drawing Sheets

OILFIELD CLEANER AND CORROSION INHIBITOR COMPRISING A POLYAMINE SULFONIC ACID SALT

CROSS-REFERENCED TO RELATED APPLICATIONS

This application is a continuation of U.S. Non-Provisional patent application Ser. No. 14/321,461, filed Jul. 1, 2014, which claims the benefit of U.S. Provisional Patent Application Ser. No. 61/842,194, filed Jul. 2, 2013, the entirety of which are herein incorporated by reference.

FIELD OF THE INVENTION

The present disclosure relates generally to cleaner/corrosion inhibitor compositions, and more particularly to compositions for removing oilfield hydrocarbon and iron sulfide based deposits from equipment and for providing protection to the equipment against corrosive fluids and gases.

BACKGROUND OF THE INVENTION

As oilfields age, the amount of oil produced decreases and the amount of water produced with the oil, increases. This water is usually disposed of or injected back into the formation to maintain reservoir pressure. The separation process is efficient, but not perfect, and a small fraction of oil and other debris can be present after the fluids pass through the separation equipment. That residual fraction of oil in water carryover can cause significant problems as the field ages. Fields can produce as much as 1,000,000 barrels of water each day. The residual oil and other particles such as paraffin, asphaltenes, iron sulfide and biomass can build up in the separation equipment and pipelines. This form of deposit is referred to in the industry as schmoo. If left untreated, this form of deposition can plug lines, which can lead to loss of revenue and/or equipment failure, and further, can result in casualties. Due to lines which cannot be mechanically cleaned, a chemical solution is needed that can be injected into the system to maintain control of the deposition in the lines.

Fluids produced in the oil and gas industry can be quite corrosive to the infrastructure by which it is produced. This internal corrosion of pipelines and production equipment is commonly treated using chemical corrosion inhibitors. Corrosion inhibitors work primarily by forming protective films on the surfaces of the infrastructure. This creates a protective barrier from the corrosive fluids. If the schmoo deposition described above is present on the internal surfaces, it does not allow the dosed corrosion inhibitor to effectively coat and protect the equipment.

What is needed is a means to chemically remove and keep schmoo from depositing on the internal surfaces of production equipment while inhibiting corrosion to help maintain the integrity of the equipment.

SUMMARY OF THE INVENTION

A composition is provided for inhibiting corrosion and/or removing hydrocarbonaceous deposits from equipment used in oil and gas applications, the composition comprising a polyamine sulfonic acid salt.

The polyamine sulfonic acid salt can be formed by reaction of a polyamine component with a sulfonic acid component.

The polyamine component can comprise a polyalkylene polyamine having from about three to about ten nitrogen atoms per molecule. Polyamines containing four or more nitrogen atoms per molecule are generally available as mixtures of linear, branched, and cyclic compounds, most of which contain the same number of nitrogen atoms.

The polyalkylene component can be a polyethylene polyamine, a polypropylene polyamine, a polybutylene polyamine, and combinations thereof.

Preferably, the polyamine component comprises a mixture of tetraethylenepentamine (TEPA), pentaethylenehexamine (PEHA), and hexaethyleneheptamine (HEHA).

The sulfonic acid salt component is selected from the group consisting of an aryl sulfonic acid, an alkyl sulfonic acid, an arylalkyl sulfonic acid, and combinations thereof.

Preferably, the organic sulfonic acid component is an aryl sulfonic acid comprising linear and/or branched dodecylbenzenesulfonic acid.

The composition can further comprise a corrosion inhibitor component, including an imidazoline of Formula (I) or an imidazolinium salt of Formula (II),

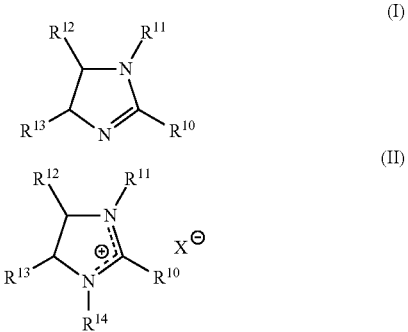

wherein $R^{10}$ is a $C_1$-$C_{20}$ alkyl or a $C_1$-$C_{20}$ alkoxyalkyl group; $R^{11}$ and $R^{14}$ are independently hydrogen, $C_1$-$C_6$ alkyl, $C_1$-$C_6$ hydroxyalkyl, or $C_1$-$C_6$ arylalkyl; $R^{12}$ and $R^{13}$ are independently a $C_1$-$C_6$ alkyl group or hydrogen; $X^-$ is chloride, bromide, iodide, carbonate, sulfonate, phosphate or an anion of an organic carboxylic acid including, but not limited to, acetate; or a tautomer thereof.

Preferably, the corrosion inhibitor component is an imidazolinium salt of Formula (II) wherein $R^{10}$ is an alkyl mixture typical in tall oil fatty acid (TOFA); $R^{11}$ is benzyl; $R^{12}$ and $R^{13}$ are each hydrogen, $R^{14}$ is hydroxyethyl, and $X^-$ is chloride.

The corrosion inhibitor component can include a pyridinium salt of Formula

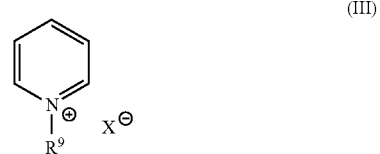

wherein $R^9$ is an alkyl group, an aryl group, or an arylalkyl group, wherein said alkyl groups have from 1 to about 18 carbon atoms, and $X^-$ is chloride, bromide, or iodide. Preferably, the corrosion inhibitor component is a pyridinium salt of Formula (III), wherein $R^9$ is benzyl, and $X^-$ is chloride.

The corrosion inhibitor component can include an ethoxylated amine. The ethoxylated amine can be ethoxylated tallow amine.

The composition can further comprise a synergist. The synergist can be selected from the group consisting of thioglycolic acid, 3,3'-dithiodipropionic acid, thiosulfate, thiourea, 2-mercaptoethanol, L-cysteine, tert-butyl mercaptan, and combinations thereof. The synergist can be 2-mercaptoethanol.

The composition can further comprise an alcoholic solvent, including but not limited to, methanol.

The composition provides at least 95% corrosion protection after 12 hours, 18 hours, or 24 hours for a 1018 carbon steel working electrode in a bubble test, wherein the bubble test is characterized by: (a) a testing temperature of about 60° C.; (b) a carbon dioxide saturated liquid medium of 10% field crude oil and 90% synthetic brine; and (c) an inhibitor dosage of 20 ppm based on total fluids. The composition can provide 98% protection after 12 hours, 18 hours, or 24 hours.

The composition provides greater than or equal to 40% schmoo removal in a Dynamic Schmoo Removal Loop ("DSRL") test conducted at a dosage of 500 or 1,000 ppm in brine at 122° F. The composition can provide greater than or equal to 60% schmoo removal in a Dynamic Schmoo Removal Loop ("DSRL") test conducted at a dosage of 1,000 ppm in brine at 122° F.

The cleaner/corrosion inhibitor composition can comprise: (i) a polyamine sulfonic acid salt comprising at least one salt selected from a tetraethylenepentamine dodecylbenzenesulfonic acid salt, a pentaethylenehexamine dodecylbenzenesulfonic acid salt, and a hexaethyleneheptamine dodecylbenzenesulfonic acid salt; (ii) 2-mercaptoethanol; and (ii) methanol. Optionally, the cleaner/corrosion inhibitor composition can further comprise a corrosion inhibitor component comprising an imidazolinium salt (e.g., 1-benzyl-1-(2-hydroxyethyl)-2-tall oil-2-imidazolinium chloride), a pyridinium salt (e.g., benzyl pyridinium chloride), and an ethoxylated alkyl amine (e.g., ethoxylated tallow amine). The cleaner/corrosion inhibitor composition can comprise a mixture of a tetraethylenepentamine dodecylbenzenesulfonic acid salt, a pentaethylenehexamine dodecylbenzenesulfonic acid salt, and a hexaethyleneheptamine dodecylbenzenesulfonic acid salt.

The composition can comprise 35 wt. % polyamine sulfonic acid salt, 8 wt. % of a synergist, and 57 wt. % solvent, based on total weight of the composition.

Preferably, the composition comprises 35 wt. % of polyamine sulfonic acid salt, 15 wt. % of a corrosion inhibitor component, 8 wt. % of 2-mercaptoethanol, and 42 wt. % methanol based on total weight of the composition.

A method of inhibiting corrosion at a surface and/or removing hydrocarbonaceous deposits from a surface is also provided. The method comprises contacting a surface with an effective amount of a cleaner/corrosion inhibitor composition.

A method of preparing a cleaner/corrosion inhibitor composition is also provided. The method comprises combining a polyamine component and a sulfonic acid component to provide a polyamine sulfonic acid salt; and combining the polyamine sulfonic acid salt component and a synergist, optionally at least one corrosion inhibitor component, and optionally at least one solvent. The polyamine component can comprise a tetraethylenepentamine, a pentaethylenehexamine, a hexaethyleneheptamine, and combinations thereof. The sulfonic acid component can be linear or branched dodecylbenzenesulfonic acid or a combination thereof.

Other objects and features will be in part apparent and in part pointed out hereinafter.

DETAILED DESCRIPTION

Figure 1:
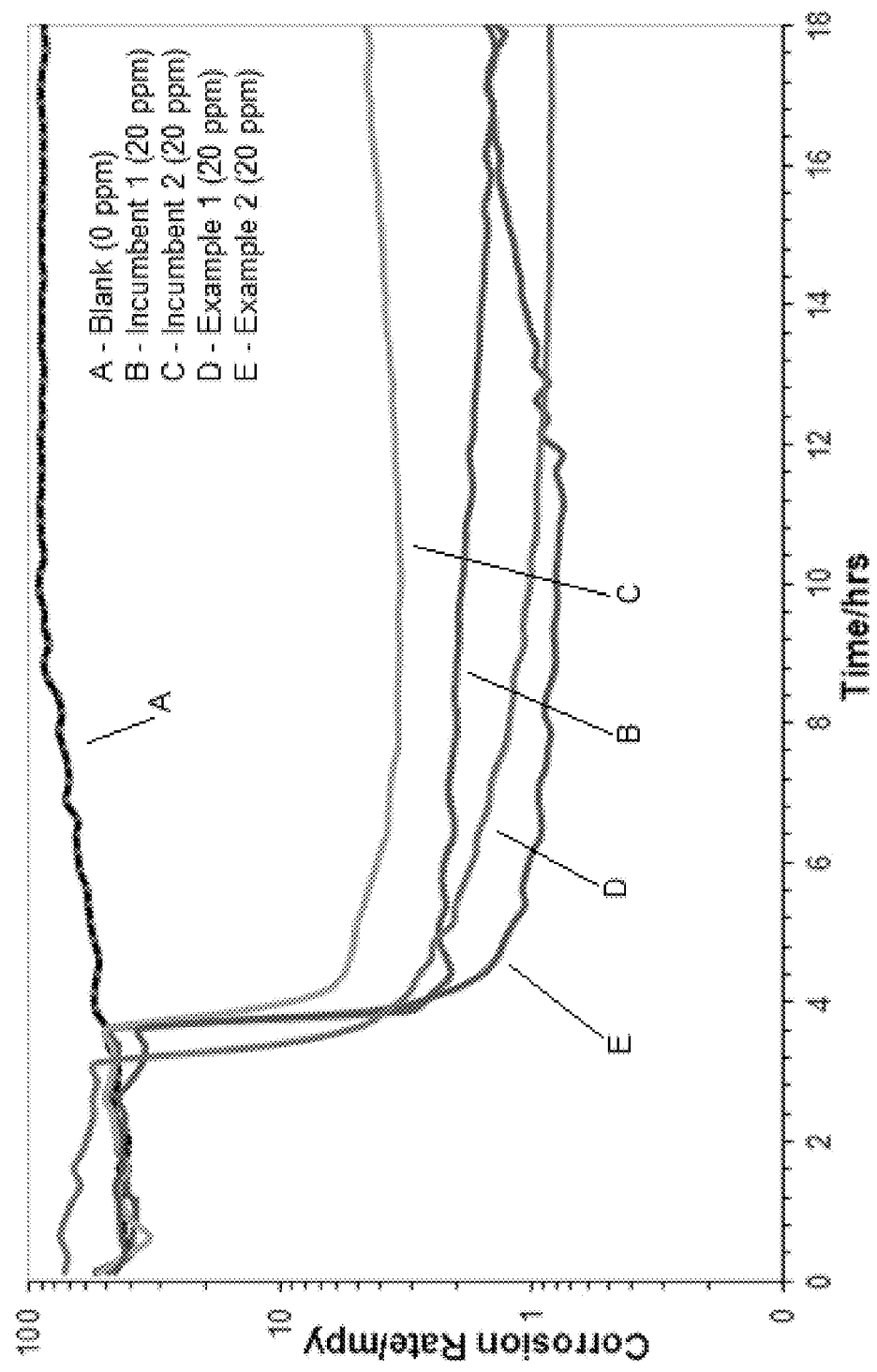
FIG. 1 is a graph of the corrosion rate versus time.

Disclosed herein are cleaner/corrosion inhibitor compositions, methods of using said compositions, and processes for their preparation. The compositions are useful in crude oil based and natural gas based products, processes, and refinery streams. The described compositions are particularly effective for inhibiting corrosion of mild steel in hydrocarbon, oil/brine mixtures, and aqueous systems. The compositions are also particularly useful for removing hydrocarbonaceous deposits (e.g., schmoo) from metallic or mineral surfaces in contact with a fluid in oil and gas applications. The compositions can be used in sweet systems (i.e., systems having a relatively high carbon dioxide concentration) or in systems having sour conditions (i.e., relatively high hydrogen sulfide concentration). The compositions are useful in a wide range of climates and under a wide range of process conditions, (e.g., 0° C. to 200° C.), where other available cleaner/corrosion inhibitor compositions fail.

The control and prevention of schmoo is difficult. Schmoo deposits are sticky and difficult to clean, particularly near welds. Currently, commercially available cleaners for removing schmoo from equipment used in oil and gas applications suffer from charge repulsive interactions at the surface interfaces and provide only limited cleaning ability.

The disclosed compositions comprise a salt resulting from combination of a polyamine component and a sulfonic acid component. Without being bound by theory, it is believed that the unexpected, superior cleaning performance of the disclosed compositions result from reduced charge repulsion at treated surfaces (e.g., interior of pipeline, dirty production equipment). The salt, in addition to cleaning performance, may act as a corrosion inhibitor.

1. DEFINITION OF TERMS

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only, and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

The term "suitable substituent," as used herein, is intended to mean a chemically acceptable functional group, preferably a moiety that does not negate the activity of the inventive compounds. Such suitable substituents include, but are not limited to halo groups, perfluoroalkyl groups, perfluoroalkoxy groups, alkyl groups, alkenyl groups, alkynyl groups, hydroxy groups, oxo groups, mercapto groups, alkylthio groups, alkoxy groups, aryl or heteroaryl groups, aryloxy or heteroaryloxy groups, aralkyl or heteroaralkyl groups, aralkoxy or heteroaralkoxy groups, HO—(C=O)- groups, heterocyclic groups, cycloalkyl groups, amino groups, alkyl- and dialkylamino groups, carbamoyl groups, alkylcarbonyl groups, alkoxycarbonyl groups, alkylaminocarbonyl groups, dialkylamino carbonyl groups, arylcarbonyl groups, aryloxycarbonyl groups, alkylsulfonyl groups, and arylsulfonyl groups. Those skilled in the art will appreciate that many substituents can be substituted by additional substituents.

The term "alkyl," as used herein, refers to a linear or branched hydrocarbon radical, preferably having 1 to 32 carbon atoms (i.e., 1, 2, 3, 4, 5, 6, 7, 8, 9, 10, 11, 12, 13, 14, 15, 16, 17, 18, 19, 20, 21, 22, 23, 24, 25, 26, 27, 28, 39, 30, 31, or 32 carbons). Alkyl groups include, but are not limited to, methyl, ethyl, n-propyl, isopropyl, n-butyl, iso-butyl, secondary-butyl, and tertiary-butyl. Alkyl groups can be unsubstituted or substituted by one or more suitable substituents, as defined above.

The term "alkenyl," as used herein, refers to a straight or branched hydrocarbon radical, preferably having 2, 3, 4, 5, 6, 7, 8, 9, 10, 11, 12, 13, 14, 15, 16, 17, 18, 19, 20, 21, 22, 23, 24, 25, 26, 27, 28, 39, 30, 31, or 32 carbons, and having one or more carbon-carbon double bonds. Alkenyl groups include, but are not limited to, ethenyl, 1-propenyl, 2-propenyl (allyl), isopropenyl, 2-methyl-1-propenyl, 1-butenyl, and 2-butenyl. Alkenyl groups can be unsubstituted or substituted by one or more suitable substituents, as defined above.

The term "alkynyl," as used herein, refers to a straight or branched hydrocarbon radical, preferably having 2, 3, 4, 5, 6, 7, 8, 9, 10, 11, 12, 13, 14, 15, 16, 17, 18, 19, 20, 21, 22, 23, 24, 25, 26, 27, 28, 39, 30, 31, or 32 carbons, and having one or more carbon-carbon triple bonds. Alkynyl groups include, but are not limited to, ethynyl, propynyl, and butynyl. Alkynyl groups can be unsubstituted or substituted by one or more suitable substituents, as defined above.

The term "alkoxy," as used herein, refers to an alkyl group, as defined herein, appended to the parent molecular moiety through an oxygen atom.

The term "aryl," as used herein, means monocyclic, bicyclic, or tricyclic aromatic radicals such as phenyl, naphthyl, tetrahydronaphthyl, indanyl and the like; optionally substituted by one or more suitable substituents, preferably 1 to 5 suitable substituents, as defined above.

The term "carbonyl," "(C=O)" or "—C(O)—" (as used in phrases such as alkylcarbonyl, alkyl —(C=O)— or alkoxycarbonyl) refers to the joinder of the >C=O moiety to a second moiety such as an alkyl or amino group (i.e. an amido group). Alkoxycarbonylamino (i.e., alkoxy(C=O)—NH—) refers to an alkyl carbamate group. The carbonyl group is also equivalently defined herein as (C=O). Alkylcarbonylamino refers to groups such as acetamide.

The term "cycloalkyl", as used herein, refers to a mono, bicyclic or tricyclic carbocyclic radical (e.g., cyclopropyl, cyclobutyl, cyclopentyl, cyclohexyl, cycloheptyl, cyclooctyl, cyclononyl, cyclopentenyl, cyclohexane, bicyclo[2.2.1] heptanyl, bicyclo[3.2.1]octanyl and bicyclo[5.2.0]nonanyl, etc.); optionally containing 1 or 2 double bonds. Cycloalkyl groups can be unsubstituted or substituted by one or more suitable substituents, preferably 1 to 5 suitable substituents, as defined above.

The term "halo" or "halogen," as used herein, refers to a fluoro, chloro, bromo or iodo radical.

The term "heteroaryl," as used herein, refers to a monocyclic, bicyclic, or tricyclic aromatic heterocyclic group containing one or more heteroatoms selected from O, S and N in the ring(s). Heteroaryl groups include, but are not limited to, pyridyl, pyrazinyl, pyrimidinyl, pyridazinyl, thienyl, furyl, imidazolyl, pyrrolyl, oxazolyl (e.g., 1,3-oxazolyl, 1,2-oxazolyl), thiazolyl (e.g., 1,2-thiazolyl, 1,3-thiazolyl), pyrazolyl, tetrazolyl, triazolyl (e.g., 1,2,3-triazolyl, 1,2,4-triazolyl), oxadiazolyl (e.g., 1,2,3-oxadiazolyl), thiadiazolyl (e.g., 1,3,4-thiadiazolyl), quinolyl, isoquinolyl, benzothienyl, benzofuryl, and indolyl. Heteroaryl groups can be unsubstituted or substituted by one or more suitable substituents, preferably 1 to 5 suitable substituents, as defined above.

The term "heterocycle," as used herein, refers to a monocyclic, bicyclic, or tricyclic group containing 1 to 4 heteroatoms selected from N, O, $S(O)_n$, $P(O)_n$, $PR^x$, NH or $NR^x$, wherein $R^x$ is a suitable substituent. Heterocyclic groups optionally contain 1 or 2 double bonds. Heterocyclic groups include, but are not limited to, azetidinyl, tetrahydrofuranyl, imidazolidinyl, pyrrolidinyl, piperidinyl, piperazinyl, oxazolidinyl, thiazolidinyl, pyrazolidinyl, thiomorpholinyl, tetrahydrothiazinyl, tetrahydrothiadiazinyl, morpholinyl, oxetanyl, tetrahydrodiazinyl, oxazinyl, oxathiazinyl, indolinyl, isoindolinyl, quinuclidinyl, chromanyl, isochromanyl, and benzoxazinyl. Examples of monocyclic saturated or partially saturated ring systems are tetrahydrofuran-2-yl, tetrahydrofuran-3-yl, imidazolidin-1-yl, imidazolidin-2-yl, imidazolidin-4-yl, pyrrolidin-1-yl, pyrrolidin-2-yl, pyrrolidin-3-yl, piperidin-1-yl, piperidin-2-yl, piperidin-3-yl, piperazin-1-yl, piperazin-2-yl, piperazin-3-yl, 1,3-oxazolidin-3-yl, isothiazolidine, 1,3-thiazolidin-3-yl, 1,2-pyrazolidin-2-yl, 1,3-pyrazolidin-1-yl, thiomorpholin-yl, 1,2-tetrahydrothiazin-2-yl, 1,3-tetrahydrothiazin-3-yl, tetrahydrothiadiazinyl, morpholinyl, 1,2-tetrahydrodiazin-2-yl, 1,3-tetrahydrodiazin-1-yl, 1,4-oxazin-2-yl, and 1,2,5-oxathiazin-4-yl. Heterocyclic groups can be unsubstituted or substituted by one or more suitable substituents, preferably 1 to 3 suitable substituents, as defined above.

The term "hydroxy," as used herein, refers to an —OH group.

The term "oxo," as used herein, refers to a double bonded oxygen (=O) radical wherein the bond partner is a carbon atom. Such a radical can also be thought as a carbonyl group.

The term "counterion," as used herein, means a halide (e.g., fluoride, chloride, bromide, iodide), a carboxylate anion, such as selected from deprotonation of mineral acid, acrylic acid, acetic acid, methacrylic acid, glycolic acid, thioglycolic acid, propionic acid, butyric acid, and the like, or any other anionic constituent that satisfies the charge balance necessary to form a neutral molecule.

The term "sweetening," as used herein, can refer to a process that removes sulfur species from a gas or liquid. The sulfur species can include hydrogen sulfide and mercaptans.

The term "sour gas," as used herein, can refer to a gas that includes significant amounts of sulfur species, such as hydrogen sulfide and/or mercaptans.

The term "sour liquid" or "sour fluid," as used herein, can refer to a liquid that includes significant amounts of sulfur species, such as hydrogen sulfide and/or mercaptans.

The term "water cut," as used herein, means the percentage of water in a composition containing an oil and water mixture.

The term "hydrocarbonaceous deposit," as used herein, refers to any deposit including at least one hydrocarbon constituent and forming on the inner surface of flowlines, pipelines, injection lines, wellbore surfaces, storage tanks, process equipment, vessels, the like, and other components in oil and gas applications. Such deposits also include "schmoo," which refers to a solid, paste-like, or sludge-like substance that adheres to almost any surface with which it comes in contact and is particularly difficult to remove. Deposits contributing to schmoo can include, for example, sand, clays, sulfur, naphthenic acid salts, corrosion byproducts, biomass, and other hydrocarbonaceous materials bound together with oil. These terms are used interchangeably herein.

The term "TOFA," as used herein, refers to a tall oil fatty acid that is a distilled product derived from trees and includes a mixture of fatty acids.

The term "barrel" as used herein designates the standard 42 U.S. gallon barrel commonly used as a measure in oil field practice.

The term "molar equivalent" as used herein is defined as the amount of a substance which will either react with or supply one mole of hydrogen ions (H+) in an acid-base reaction.

2. COMPOSITIONS

The cleaner/corrosion inhibitor compositions disclosed herein comprise a polyamine sulfonic acid salt. The compositions can further include one or more additional corrosion inhibitors, synergists, and/or solvents. The compositions can provide both corrosion protection and a cleaning effect for applications relating to the production, transportation, storage, and separation of crude oil and natural gas. In particular, the compositions can improve production in an oil and/or gas application by reducing a corrosion rate of and/or removing hydrocarbonaceous deposits (e.g., schmoo) from metallic or mineral surfaces in contact with a fluid in oil and gas applications. The compositions can enhance oil and gas production by keeping surface facility equipment, pipelines, downhole injection tubing and infrastructure, and pore throats around an injector clean to accept an optimum water volume. The compositions can be used in continuous and/or batch dosages to clean out process equipment that has a tendency to accumulate deposits.

The polyamine sulfonic acid salt results from a synergistic combination of a polyamine component and a sulfonic acid component. Without being bound by theory, it is believed that the unexpected superior cleaning performance of the disclosed compositions can be a result of the synergistic combination of the polyamine and sulfonic acid to provide a salt with reduced charge repulsion at treated surfaces (e.g., pipelines); whereas currently available compositions suffer from charge repulsive interactions at the surface interface and provide only limited cleaning ability.

The compositions can provide greater than or equal to 90% corrosion protection, greater than or equal to 95% corrosion protection, greater than or equal to 96% corrosion protection, greater than or equal to 97% corrosion protection, greater than or equal to 98% corrosion protection, greater than or equal to 99% corrosion protection, or 100% corrosion protection. The compositions can provide at least 98% corrosion protection after 12 hours, at least 98% corrosion protection after 18 hours, and/or at least 98% corrosion protection after 20 hours for a carbon steel working electrode (e.g., a 1018 carbon steel working electrode) in a bubble test, wherein the bubble test is characterized by a testing temperature of about 60° C.; a carbon dioxide saturated liquid medium of 10% field crude oil and 90% synthetic brine; and an inhibitor dosage of 20 ppm based on total fluids. The composition can provide about 98.5% corrosion protection after 12 hours, about 98.3% corrosion protection after 18 hours, and about 98.5% corrosion protection after 20 hours. The composition can provide about 98.6% corrosion protection after 12 hours, about 98.1% corrosion protection after 18 hours, and about 98.2% corrosion protection after 20 hours.

The compositions can provide a percent mass removal of hydrocarbonaceous deposits from an apparatus, the percent mass removal greater than or equal to 10%, greater than or equal to 20%, greater than or equal to 30%, greater than or equal to 40%, greater than or equal to 50%, or greater than or equal to 60%. Dosed at 50 ppm, the compositions can provide a percent mass removal of greater than or equal to 8%. Dosed at 100 ppm, the compositions can provide a percent mass removal of greater than or equal to 13%. Dosed at 200 ppm, the compositions can provide a percent mass removal of greater than or equal to 21%. Dosed at 500 ppm, the compositions can provide a percent mass removal of greater than or equal to 49%. Dosed at 1,000 ppm, the compositions can provide a percent mass removal of greater than or equal to 61%. In a flow test, known as a Dynamic Schmoo Removal Loop ("DSRL"), conducted at dosages of 50, 100, 200, 500, or 1,000 ppm in brine at 122° F., the compositions can provide a percent schmoo removal of greater than or equal to 10%, greater than or equal to 20%, greater than or equal to 30%, greater than or equal to 40%, greater than or equal to 50%, or greater than or equal to 60%.

(a) Polyamine Sulfonic Acid Salt

The compositions disclosed herein comprise a polyamine sulfonic acid salt formed by reaction of a polyamine component with a sulfonic acid component. The polyamine sulfonic acid salt can act as a corrosion inhibitor, a cleaner, or both.

The molar equivalent ratio of the polyamine component to the sulfonic acid component can range from 1:1 to 1:3. For example, the polyamine sulfonic acid salt can comprise one molar equivalent of the polyamine component and one molar equivalent of the sulfonic acid component, one molar equivalent of the polyamine component and two molar equivalents of the sulfonic acid component, or one molar equivalent of the polyamine component and three molar equivalents of the sulfonic acid component.

The components of the polyamine sulfonic acid salt can also be determined as a weight ratio. The weight ratio of the polyamine component to the sulfonic acid component can range from 1:2 to 2:1, and preferably from 1:1 to 1:1.5.

The polyamine sulfonic acid salt component can comprise a single polyamine sulfonic acid salt, or can comprise a mixture of polyamine sulfonic acid salts. The polyamine sulfonic acid salt component comprises a tetraethylenepentamine dodecylbenzenesulfonic acid salt, a pentaethylenehexamine dodecylbenzenesulfonic acid salt, a hexaethyleneheptamine dodecylbenzenesulfonic acid salt, or any combination thereof. The dodecylbenzenesulfonic acid can be a linear dodecylbenzenesulfonic acid, a branched dodecylbenzenesulfonic acid, or a combination thereof.

The polyamine sulfonic acid salt component can be present in the compositions in an amount ranging from about 10 wt. % to about 70 wt. %, based on total weight of the composition. The polyamine sulfonic acid salt component can constitute 25 wt % to 45 wt % of the cleaner/corrosion inhibitor composition, based on total weight of the composition. The polyamine sulfonic acid salt component can constitute about 25 wt %, about 26 wt %, about 27 wt %, about 28 wt %, about 29 wt %, about 30 wt %, about 31 wt %, about 32 wt %, about 33 wt %, about 34 wt %, about 35 wt %, about 36 wt %, about 37 wt %, about 38 wt %, about 39 wt %, about 40 wt %, about 41 wt %, about 42 wt %, about 43 wt %, about 44 wt %, or about 45 wt % of the cleaner/corrosion inhibitor composition, based on total weight of the composition. Preferably, the polyamine sulfonic acid salt component is present in an amount of about 35 wt. %, based on total weight of the composition.

The composition can comprise from about 10 to about 70 wt. % of the polyamine sulfonic acid salt based on total weight of the composition. Preferably, the composition comprises from about 25 to about 45 wt. % of the polyamine sulfonic acid salt. More preferably, the composition comprises from about 30 to about 40 wt. % of the polyamine sulfonic acid salt. Even more preferably, the composition comprises 35 wt. % of the polyamine sulfonic acid salt.

i. Polyamine Component

The polyamine component of the polyamine sulfonic acid salt component can constitute 5 wt % to 50 wt % of the cleaner/corrosion inhibitor composition, based on total weight of the composition. The polyamine(s) can constitute 10 wt % to 30 wt % of the cleaner/corrosion inhibitor composition, based on total weight of the composition. The polyamine(s) can constitute about 10 wt %, about 11 wt %, about 12 wt %, about 13 wt %, about 14 wt %, about 15 wt %, about 16 wt %, about 17 wt %, about 18 wt %, about 19 wt %, about 20 wt %, about 21 wt %, about 22 wt %, about 23 wt %, about 24 wt %, about 25 wt %, about 26 wt %, about 27 wt %, about 28 wt %, about 29 wt %, or about 30 wt % of the cleaner/corrosion inhibitor composition, based on total weight of the composition. The polyamine(s) can constitute 20 wt % of the cleaner/corrosion inhibitor composition, based on total weight of the composition.

The polyamine component can constitute 20 wt % to 70 wt % of the polyamine sulfonic acid salt formed from the polyamine component and the sulfonic acid component, based on total weight of the polyamine sulfonic acid salt component. The polyamine(s) can constitute 35 wt % to 75 wt % of the polyamine sulfonic acid salt formed from the polyamine component and the sulfonic acid component, based on total weight of the polyamine sulfonic acid salt. The polyamine(s) can constitute about 35 wt %, about 36 wt %, about 37 wt %, about 38 wt %, about 39 wt %, about 40 wt %, about 41 wt %, about 42 wt %, about 43 wt %, about 44 wt %, about 45 wt %, about 46 wt %, about 47 wt %, about 48 wt %, about 49 wt %, about 50 wt %, about 51 wt %, about 52 wt %, about 53 wt %, about 54 wt %, about 55 wt %, about 56 wt %, about 57 wt %, about 58 wt %, about 59 wt %, about 60 wt %, about 61 wt %, about 62 wt %, about 63 wt %, about 64 wt %, about 65 wt %, about 66 wt %, about 67 wt %, about 68 wt %, about 69 wt %, about 70 wt %, about 71 wt %, about 72 wt %, about 73 wt %, about 74 wt %, or about 75 wt % of the polyamine sulfonic acid salt component formed from the polyamine component and the sulfonic acid component, based on total weight of the polyamine sulfonic acid salt component. The polyamine(s) can constitutes about 57 wt % of the polyamine sulfonic acid salt component formed from the polyamine component and the sulfonic acid component, based on total weight of the polyamine sulfonic acid salt component.

The polyamine component can be a composition of one or more polyamines. The polyamine component can comprise a polyalkylene polyamine. Polyalkylene polyamine compounds can include, but are not limited to polyethylene polyamines, polypropylene polyamines, polybutylene polyamines and combinations thereof.

Suitable polyethylene polyamines include, but not limited to, diethylene triamine (DETA), triethylene tetramine (TETA), tetraethylene pentamine (TEPA), pentaethylene hexamine (PEHA), hexaethylene heptamine (HEHA), and higher homologues.

Suitable polypropylene polyamines include, but not limited to, dipropylene triamine, tripropylene tetramine, tetrapropylene pentamine, pentapropylene hexamine, hexapropylene heptamine, and higher homologues.

Suitable polybutylene polyamines include, but are not limited to, dibutylene triamine, tributylene tetramine, tetrabutylene pentamine, pentabutylene hexamine, hexabutylene heptamine, and higher homologues.

Other suitable polyalkylene polyamines include bis(hexamethylene)triamine, N,N'-bis(3-aminopropyl)ethylenediamine, spermidine, and spermine.

It will be recognized by those skilled in the art that polyalkylene polyamines containing four or more nitrogen atoms are generally available as mixtures of linear, branched, and cyclic compounds, most of which contain the same number of nitrogen atoms. For example, triethylene tetramine (TETA) contains not only linear TETA, but also tris(aminoethyl)amine, N,N'-bis(2-aminoethyl)piperazine, and N-[(2-aminoethyl)-2-aminoethyl]piperazine. Similarly, tetraethylene pentamine is principally a mixture of four TEPA ethyleneamines, including linear, branched, and two cyclic TEPA products.

A preferred polyalkylene polyamine is Ethyleneamine E-100, a commercially available mixture of polyethylene polyamines comprising TEPA, PEHA, and HEHA (Huntsman Corporation). Ethyleneamine E-100 typically consists of less than 1.0 wt. % of low molecular weight amine, 10-15 wt. % TEPA, 40-50 wt. % PEHA, and the balance HEHA and higher oligomers. Typically, Ethyleneamine E-100 has total nitrogen content of about 33-34 wt. % and a number average molecular weight of 250-300 g/mole.

A suitable polyamine mixture is Heavy Polyamine X (HPA-X), commercially available from Dow Chemical Company. Heavy Polyamine X is a complex mixture of linear, branched, and cyclic polyethylene polyamines, comprising TETA, TEPA, PEHA, and polyethylene polyamines (CAS No. 68131-73-7 or CAS No. 29320-38-5).

Another suitable polyamine mixture is Amix 1000 (CAS #68910-05-4), commercially available from BASF Corporation. Amix 1000 is a mixture of roughly equivalent amounts of aminoethylethanolamine, triethylene tetramine (TETA), aminoethylpiperazine, and high boiling polyamines.

The polyamine component can comprise an etheramine, a polyetheramine, and combinations thereof. A suitable etheramine, for example, is 2-(2-(dimethylamino)ethoxy)-ethanol (CAS #1704-62-7), which can be used alone or as a commercially available mixture. Preferably, the etheramine is BASF Amix DA5, which comprises 20-80 wt. % of 2-(2-(dimethylamino)ethoxy)ethanol, 5-60 wt. % of 2-dimethylaminoethanol, <8 wt. % of ethyleneglycol, and <6 wt. % of 2-(ethenyloxy)ethanol.

Exemplary polyetheramines include, but are not limited to, Polyetheramine D230, Polyetheramine D400, Polyetheramine D2000, Polyetheramine T403, Polyetheramine T5000, all of which are commercially available from BASF Corporation.

ii. Sulfonic Acid Component

The sulfonic acid component of the polyamine sulfonic acid salt component can constitute 5 wt % to 50 wt % of the cleaner/corrosion inhibitor composition, based on total weight of the composition. The sulfonic acid(s) can constitute 5 wt % to 25 wt % of the cleaner/corrosion inhibitor composition, based on total weight of the composition. The sulfonic acid(s) can constitute about 5 wt %, about 6 wt %, about 7 wt %, about 8 wt %, about 9 wt %, about 10 wt %, about 11 wt %, about 12 wt %, about 13 wt %, about 14 wt %, about 15 wt %, about 16 wt %, about 17 wt %, about 18 wt %, about 19 wt %, about 20 wt %, about 21 wt %, about 22 wt %, about 23 wt %, about 24 wt %, or about 25 wt % of the cleaner/corrosion inhibitor composition, based on total weight of the composition. The sulfonic acid(s) can constitute 15 wt % of the cleaner/corrosion inhibitor composition, based on total weight of the composition.

The sulfonic acid component can constitute 20 wt % to 70 wt % of the polyamine sulfonic acid salt component formed from the polyamine component and the sulfonic acid component, based on total weight of the polyamine sulfonic acid salt component. The sulfonic acid component can constitute 35 wt % to 75 wt % of the polyamine sulfonic acid salt component formed from the polyamine component and the sulfonic acid component, based on total weight of the polyamine sulfonic acid salt component. The sulfonic acid component can constitute about 20 wt %, about 21 wt %, about 22 wt %, about 23 wt %, about 24 wt %, about 25 wt %, about 26 wt %, about 27 wt %, about 28 wt %, about 29 wt %, about 30 wt %, about 31 wt %, about 32 wt %, about 33 wt %, about 34 wt %, about 35 wt %, about 36 wt %, about 37 wt %, about 38 wt %, about 39 wt %, about 40 wt %, about 41 wt %, about 42 wt %, about 43 wt %, about 44 wt %, about 45 wt %, about 46 wt %, about 47 wt %, about 48 wt %, about 49 wt %, about 50 wt %, about 51 wt %, about 52 wt %, about 53 wt %, about 54 wt %, about 55 wt %, about 56 wt %, about 57 wt %, about 58 wt %, about 59 wt %, or about 60 wt % of the polyamine sulfonic acid salt component formed from the polyamine component and the sulfonic acid component, based on total weight of the polyamine sulfonic acid salt component. The sulfonic acid component can constitute about 42 wt % of the polyamine sulfonic acid salt component formed from the polyamine component and the sulfonic acid component, based on total weight of the polyamine sulfonic acid salt component.

The sulfonic acid component can be a composition of one or more sulfonic acid compounds. For example, the sulfonic acid component can comprise one or more organic sulfonic acids. The organic sulfonic acid can be an aryl sulfonic acid, including but not limited to a linear alkylbenzenesulfonic acid, a branched alkylbenzenesulfonic acids, and other substituted or unsubstituted aromatic sulfonic acids. Suitable aryl sulfonic acids include, but are not limited to, methylbenzene sulfonic acid (e.g., p-toluenesulfonic acid), ethylbenzene sulfonic acid, butylbenzene sulfonic acid, octylbenzene sulfonic acid, dodecylbenzene sulfonic acid, and 2-naphthalene sulfonic acid. Preferably, the aryl sulfonic acid is a linear or branched dodecylbenzenesulfonic acid.

The organic sulfonic acid can also be an alkyl sulfonic acid or an arylalkyl sulfonic acid, including but not limited to methanesulfonic acid, trifluoromethanesulfonic acid, DL-camphorsulfonic acid, and phenylmethanesulfonic acid.

The organic sulfonic acid can be a monosulfonic acid, a disulfonic acid, or a polysulfonic acid. Suitable disulfonic acids include, but are not limited to, benzenedisulfonic acid, napthalenedisulfonic acid, 2,3-dimethyl-1,4-benzenedisulfonic acid, 2,4-dimethyl-1,3-benzenedisulfonic acid, 2,5-dimethyl-1,3-benzenedisulfonic acid, 2,5-dimethyl-1,4-benzenedisulfonic acid, 3,6-dimethyl-1,2-benzenedisulfonic acid, or a combination thereof. Suitable polysulfonic acids include, but are not limited to, benzene trisulfonic acid, naphthalene trisulfonic acid, 1,3,6-napthalenetrisulfonic acid, 1-nitronaphthalene-3,6,8-trisulfonic acid, or a combination thereof.

(b) Corrosion Inhibitor Component

The compositions disclosed herein may include a corrosion inhibitor component comprised of one or more corrosion inhibitors. The corrosion inhibitor(s) may be present in an amount of 5 wt % to 50 wt %, based on total weight of the composition. The corrosion inhibitor(s) can constitute 5 wt % to 25 wt % of the cleaner/corrosion inhibitor composition, based on total weight of the composition. The corrosion inhibitor(s) can constitute about 5 wt %, about 6 wt %, about 7 wt %, about 8 wt %, about 9 wt %, about 10 wt %, about 11 wt %, about 12 wt %, about 13 wt %, about 14 wt %, about 15 wt %, about 16 wt %, about 17 wt %, about 18 wt %, about 19 wt %, about 20 wt %, about 21 wt %, about 22 wt %, about 23 wt %, about 24 wt %, or about 25 wt % of the cleaner/corrosion inhibitor composition, based on total weight of the composition. Preferably, the compositions comprise about 15 wt % of the corrosion inhibitor(s), based on total weight of the composition.

Suitable corrosion inhibitors include, but are not limited to, alkyl, hydroxyalkyl, alkylaryl, arylalkyl or arylamine quaternary salts; mono or polycyclic aromatic amine salts; imidazoline derivatives; mono-, di- or trialkyl or alkylaryl phosphate esters; phosphate esters of hydroxylamines; phosphate esters of polyols; and monomeric or oligomeric fatty acids.

Suitable alkyl, hydroxyalkyl, alkylaryl arylalkyl or arylamine quaternary salts include those alkylaryl, arylalkyl and arylamine quaternary salts of the formula $[N^+R^{5a}R^{6a}R^{7a}R^{8a}][X^-]$ wherein $R^{5a}$, $R^{6a}$, $R^{7a}$, and $R^{8a}$ contain one to 18 carbon atoms, and X is Cl, Br or I. For the quaternary salts, $R^{5a}$, $R^{6a}$, $R^{7a}$, and $R^{8a}$ can each be independently selected from the group consisting of alkyl (e.g., $C_1$-$C_{18}$ alkyl), hydroxyalkyl (e.g., $C_1$-$C_{18}$ hydroxyalkyl), and arylalkyl (e.g., benzyl). The mono or polycyclic aromatic amine salt with an alkyl or alkylaryl halide include salts of the formula $[N^+R^{5a}R^{6a}R^{7a}R^{8a}][X^-]$ wherein $R^{5a}$, $R^{6a}$, $R^{7a}$, and $R^{8a}$ contain one to 18 carbon atoms, and X is Cl, Br or I.

Suitable quaternary ammonium salts include, but are not limited to, tetramethyl ammonium chloride, tetraethyl ammonium chloride, tetrapropyl ammonium chloride, tetrabutyl ammonium chloride, tetrahexyl ammonium chloride, tetraoctyl ammonium chloride, benzyltrimethyl ammonium chloride, benzyltriethyl ammonium chloride, phenyltrimethyl ammonium chloride, phenyltriethyl ammonium chloride, cetyl benzyldimethyl ammonium chloride, hexadecyl trimethyl ammonium chloride, dimethyl alkyl benzyl quaternary ammonium compounds, monomethyl dialkyl benzyl quaternary ammonium compounds, trimethyl benzyl quaternary ammonium compounds, and trialkyl benzyl quaternary ammonium compounds, wherein the alkyl group can contain between about 6 and about 24 carbon atoms, about 10 and about 18 carbon atoms, or about 12 to about 16 carbon atoms. The quaternary ammonium salt can be an alkylamine benzyl quaternary ammonium salt, a benzyl triethanolamine quaternary ammonium salt, or a benzyl dimethylaminoethanolamine quaternary ammonium salt.

The corrosion inhibitor component can comprise a quaternary ammonium salt or pyridinium salt such as those represented by Formula (III):

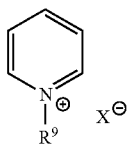
(III)

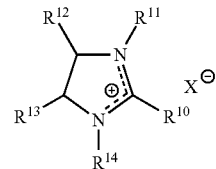
(II)

wherein R⁹ is an alkyl group, an aryl group, or an arylalkyl group, wherein said alkyl groups have from 1 to about 18 carbon atoms and X⁻ is chloride, bromide, or iodide. Among these compounds are alkyl pyridinium salts and alkyl pyridinium benzyl quats. Exemplary compounds include methyl pyridinium chloride, ethyl pyridinium chloride, propyl pyridinium chloride, butyl pyridinium chloride, octyl pyridinium chloride, decyl pyridinium chloride, lauryl pyridinium chloride, cetyl pyridinium chloride, benzyl pyridinium and an alkyl benzyl pyridinium chloride, preferably wherein the alkyl is a $C_1$-$C_6$ hydrocarbyl group. Preferably, the corrosion inhibitor includes benzyl pyridinium chloride.

The quaternary ammonium salt or pyridinium salt can constitute 0 wt % to 100 wt % of the corrosion inhibitor component, based on total weight of the corrosion inhibitor component. The quaternary ammonium salt or pyridinium salt can constitute 20 wt % to 40 wt % of the corrosion inhibitor component, based on total weight of the corrosion inhibitor component. The quaternary ammonium salt or pyridinium salt can constitute about 20 wt %, about 21 wt %, about 22 wt %, about 23 wt %, about 24 wt %, about 25 wt %, about 26 wt %, about 27 wt %, about 28 wt %, about 29 wt %, about 30 wt %, about 31 wt %, about 32 wt %, about 33 wt %, about 34 wt %, about 35 wt %, about 36 wt %, about 37 wt %, about 38 wt %, about 39 wt %, or about 40 wt % of the corrosion inhibitor component, based on total weight of the corrosion inhibitor component. Preferably, the quaternary ammonium salt or pyridinium salt constitutes 31.23 wt. % of the corrosion inhibitor component, based on total weight of the corrosion inhibitor component.

The corrosion inhibitor component can comprise an imidazoline derived from a diamine, such as ethylene diamine (EDA), diethylene triamine (DETA), triethylene tetraamine (TETA) etc. and a long chain fatty acid such as tall oil fatty acid (TOFA). Suitable imidazolines include those of Formula (I):

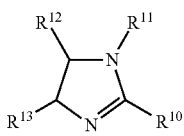
(I)

wherein R¹⁰ is a $C_1$-$C_{20}$ alkyl or a $C_1$-$C_{20}$ alkoxyalkyl group; R¹¹ is hydrogen, $C_1$-$C_6$ alkyl, $C_1$-$C_6$ hydroxyalkyl, or $C_1$-$C_6$ arylalkyl; and R¹² and R¹³ are independently a $C_1$-$C_6$ alkyl group or hydrogen. Preferably, the corrosion inhibitor is an imidazolidine wherein R¹⁰ is the alkyl mixture typical in tall oil fatty acid (TOFA), and R¹¹, R¹² and R¹³ are each hydrogen.

The corrosion inhibitor component can include an imidazolinium compound of Formula (II):

wherein R¹⁰ is a $C_1$-$C_{20}$ alkyl or a $C_1$-$C_{20}$ alkoxyalkyl group; R¹¹ and R¹⁴ are independently hydrogen, $C_1$-$C_6$ alkyl, $C_1$-$C_6$ hydroxyalkyl, or $C_1$-$C_6$ arylalkyl; R¹² and R¹³ are independently a $C_1$-$C_6$ alkyl group or hydrogen; and X⁻ is chloride, bromide, iodide, carbonate, sulfonate, phosphate, or the anion of an organic acid such as acetate. Preferably, the corrosion inhibitor component includes 1-benzyl-1-(2-hydroxyethyl)-2-tall-oil-2-imidazolinium chloride.

The imidazoline and/or imidazolinium compound can comprise 0 to 100 wt. % of the corrosion inhibitor component, based on total weight of the corrosion inhibitor component. The imidazoline and/or imidazolinium compound constitutes 20 wt % to 40 wt % of the corrosion inhibitor component, based on total weight of the corrosion inhibitor component. The imidazoline and/or imidazolinium compound constitutes about 20 wt %, about 21 wt %, about 22 wt %, about 23 wt %, about 24 wt %, about 25 wt %, about 26 wt %, about 27 wt %, about 28 wt %, about 29 wt %, about 30 wt %, about 31 wt %, about 32 wt %, about 33 wt %, about 34 wt %, about 35 wt %, about 36 wt %, about 37 wt %, about 38 wt %, about 39 wt %, or about 40 wt % of the corrosion inhibitor component, based on total weight of the corrosion inhibitor component. The imidazoline and/or imidazolinium compound can constitute 27.11 wt % of the corrosion inhibitor component, based on total weight of the corrosion inhibitor component.

Suitable mono-, di- and trialkyl as well as alkylaryl phosphate esters and phosphate esters of mono, di, and triethanolamine typically contain between from 1 to about 18 carbon atoms. Preferred mono-, di- and trialkyl phosphate esters, alkylaryl or arylalkyl phosphate esters are those prepared by reacting a $C_3$-$C_{18}$ aliphatic alcohol with phosphorous pentoxide. The phosphate intermediate interchanges its ester groups with triethyl phosphate with triethylphosphate producing a more broad distribution of alkyl phosphate esters.

Alternatively, the phosphate ester can be made by admixing with an alkyl diester, a mixture of low molecular weight alkyl alcohols or diols. The low molecular weight alkyl alcohols or diols preferably include $C_6$ to $C_{10}$ alcohols or diols. Further, phosphate esters of polyols and their salts containing one or more 2-hydroxyethyl groups, and hydroxylamine phosphate esters obtained by reacting polyphosphoric acid or phosphorus pentoxide with hydroxylamines such as diethanolamine or triethanolamine are preferred.

The corrosion inhibitor component can include a monomeric or oligomeric fatty acid. Preferred are $C_{14}$-$C_{22}$ saturated and unsaturated fatty acids as well as dimer, trimer and oligomer products obtained by polymerizing one or more of such fatty acids.

The corrosion inhibitor component can comprise an ethoxylated amine. The ethoxylated amine can be an ethoxylated alkyl amine. The ethoxylated amine can be ethoxylated tallow amine. The ethoxylated amine can constitute 0 wt % to 70 wt % of the corrosion inhibitor component, based on total weight of the corrosion inhibitor component. The ethoxylated amine can constitute 20 wt % to 40 wt % of the corrosion inhibitor component, based on total weight of the corrosion inhibitor component. The ethoxylated amine can constitute about 20 wt %, about 21 wt %, about 22 wt %, about 23 wt %, about 24 wt %, about 25 wt %, about 26 wt %, about 27 wt %, about 28 wt %, about 29 wt %, about 30 wt %, about 31 wt %, about 32 wt %, about 33 wt %, about 34 wt %, about 35 wt %, about 36 wt %, about 37 wt %, about 38 wt %, about 39 wt %, or about 40 wt % of the corrosion inhibitor component, based on total weight of the corrosion inhibitor component. The ethoxylated amine can constitute 27.06 wt % of the corrosion inhibitor component, based on total weight of the corrosion inhibitor component.

The corrosion inhibitor can comprise 2-alkyl-1-benzyl-1-(2-hydroxyethyl)-2-imidazolium chlorides (e.g., $C_{12}$-, $C_{14}$-, $C_{16}$-, and/or $C_{18}$-alkyl-1-benzyl-1-(2-hydroxyethyl)-2-imidazolium chlorides), N-benzylpyridinium chlorides (e.g., N-benzyl-pyridinium chloride, N-benzyl-picolinium chloride), ethoxylated tallow amine, and combinations thereof.

Preferably, the corrosion inhibitor comprises a mixture of 1-benzyl-1-(2-hydroxyethyl)-2-tall oil-2-imidazolinium chloride (e.g., about 27 wt. %), N-benzyl-pyridinium chloride (e.g., about 31 wt. %), and ethoxylated tallow amine (e.g., about 27 w.t %).

(c) Synergist

The compositions disclosed herein can include a synergist. The synergist can be present in an amount of 1 wt % to 20 wt %, based on total weight of the composition. The synergist can constitute about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, about 15 wt %, about 16 wt %, about 17 wt %, about 18 wt %, about 19 wt %, or about 20 wt % of the cleaner/corrosion inhibitor composition, based on total weight of the composition. The synergist can be present in an amount of about 8 wt %, based on total weight of the composition.

Suitable synergists include compounds that enhance the corrosion inhibiting and/or cleaning performance of the composition. The synergist can be a sulfur-containing compound, including but not limited to, thioglycolic acid, 3,3'-dithiodipropionic acid, thiosulfate, thiourea, 2-mercaptoethanol, L-cysteine, and tert-butyl mercaptan. Preferably, the synergist is 2-mercaptoethanol.

(d) Solvent

The compositions disclosed herein can include a solvent. The solvent can be present in an amount of 10 wt % to 80 wt %, based on total weight of the composition. The solvent can constitute 20 wt % to 60 wt % of the cleaner/corrosion inhibitor composition, based on total weight of the composition. The solvent can constitute about 20 wt %, about 21 wt %, about 22 wt %, about 23 wt %, about 24 wt %, about 25 wt %, about 26 wt %, about 27 wt %, about 28 wt %, about 29 wt %, about 30 wt %, about 31 wt %, about 32 wt %, about 33 wt %, about 34 wt %, about 35 wt %, about 36 wt %, about 37 wt %, about 38 wt %, about 39 wt %, about 40 wt %, about 41 wt %, about 42 wt %, about 43 wt %, about 44 wt %, about 45 wt %, about 46 wt %, about 47 wt %, about 48 wt %, about 49 wt %, about 50 wt %, about 51 wt %, about 52 wt %, about 53 wt %, about 54 wt %, about 55 wt %, about 56 wt %, about 57 wt %, about 58 wt %, about 59 wt %, or about 60 wt % of the cleaner/corrosion inhibitor composition, based on total weight of the composition. The solvent can be present in an amount of about 42 wt %, based on total weight of the composition. The solvent can be methanol and is present in an amount of about 42 wt %, based on total weight of the composition.

Suitable solvents include, but are not limited to, alcohols, hydrocarbons, ketones, ethers, aromatics, amides, nitriles, sulfoxides, esters, and aqueous systems. The solvent can be water, isopropanol, methanol, ethanol, 2-ethylhexanol, heavy aromatic naphtha, toluene, ethylene glycol, ethylene glycol monobutyl ether (EGMBE), diethylene glycol monoethyl ether, or xylene. Representative polar solvents suitable for formulation with the composition include water, brine, seawater, alcohols (including straight chain or branched aliphatic such as methanol, ethanol, propanol, isopropanol, butanol, 2-ethylhexanol, hexanol, octanol, decanol, 2-butoxyethanol, etc.), glycols and derivatives (ethylene glycol, 1,2-propylene glycol, 1,3-propylene glycol, ethylene glycol monobutyl ether, etc.), ketones (cyclohexanone, diisobutylketone), N-methylpyrrolidinone (NMP), N,N-dimethylformamide, and the like. Representative non-polar solvents suitable for formulation with the composition include aliphatic hydrocarbons such as pentane, hexane, cyclohexane, methylcyclohexane, heptane, decane, dodecane, diesel, and the like; aromatic hydrocarbons such as toluene, xylene, heavy aromatic naphtha; and fatty acid derivatives (acids, esters, amides), and the like.

The solvent can be a solvent compatible with an arctic environment, as for example, methanol.

The compositions of the invention can optionally include one or more additives. Suitable additives include, but are not limited to, asphaltene inhibitors, paraffin inhibitors, scale inhibitors, emulsifiers, water clarifiers, dispersants, emulsion breakers, hydrogen sulfide scavengers, gas hydrate inhibitors, biocides, pH modifiers, and surfactants.

(e) Asphaltene Inhibitors

Suitable asphaltene inhibitors include, but are not limited to, aliphatic sulfonic acids; alkyl aryl sulfonic acids; aryl sulfonates; lignosulfonates; alkylphenol/aldehyde resins and similar sulfonated resins; polyolefin esters; polyolefin imides; polyolefin esters with alkyl, alkylenephenyl or alkylenepyridyl functional groups; polyolefin amides; polyolefin amides with alkyl, alkylenephenyl or alkylenepyridyl functional groups; polyolefin imides with alkyl, alkylenephenyl or alkylenepyridyl functional groups; alkenyl/vinyl pyrrolidone copolymers; graft polymers of polyolefins with maleic anhydride or vinyl imidazole; hyperbranched polyester amides; polyalkoxylated asphaltenes, amphoteric fatty acids, salts of alkyl succinates, sorbitan monooleate, and polyisobutylene succinic anhydride.

(f) Paraffin Inhibitors

Suitable paraffin inhibitors include, but are not limited to, paraffin crystal modifiers, and dispersant/crystal modifier combinations. Suitable paraffin crystal modifiers include, but are not limited to, alkyl acrylate copolymers, alkyl acrylate vinylpyridine copolymers, ethylene vinyl acetate copolymers, maleic anhydride ester copolymers, branched polyethylenes, naphthalene, anthracene, microcrystalline wax and/or asphaltenes. Suitable dispersants include, but are not limited to, dodecyl benzene sulfonate, oxyalkylated alkylphenols, and oxyalkylated alkylphenolic resins.

(g) Scale Inhibitors

Suitable scale inhibitors include, but are not limited to, phosphates, phosphate esters, phosphoric acids, phosphonates, phosphonic acids, polyacrylamides, salts of acrylamidomethyl propane sulfonate/acrylic acid copolymer (AMPS/AA), phosphinated maleic copolymer (PHOS/MA), and salts of a polymaleic acid/acrylic acid/acrylamidomethyl propane sulfonate terpolymer (PMA/AA/AMPS).

(h) Emulsifiers

Suitable emulsifiers include, but are not limited to, salts of carboxylic acids, products of acylation reactions between carboxylic acids or carboxylic anhydrides and amines, and alkyl, acyl and amide derivatives of saccharides (alkylsaccharide emulsifiers).

(i) Water Clarifiers

Suitable water clarifiers include, but are not limited to, inorganic metal salts such as alum, aluminum chloride, and aluminum chlorohydrate, or organic polymers such as acrylic acid based polymers, acrylamide based polymers, polymerized amines, alkanolamines, thiocarbamates, and cationic polymers such as diallyldimethylammonium chloride (DADMAC).

(j) Dispersants

Suitable dispersants include, but are not limited to, aliphatic phosphonic acids with 2-50 carbons, such as hydroxyethyl diphosphonic acid, and aminoalkyl phosphonic acids, e.g. polyaminomethylene phosphonates with 2-10 N atoms e.g. each bearing at least one methylene phosphonic acid group; examples of the latter are ethylenediamine tetra(methylene phosphonate), diethylenetriamine penta(methylene phosphonate), and the triamine- and tetramine-polymethylene phosphonates with 2-4 methylene groups between each N atom, at least 2 of the numbers of methylene groups in each phosphonate being different. Other suitable dispersion agents include lignin, or derivatives of lignin such as lignosulfonate and naphthalene sulfonic acid and derivatives.

(k) Emulsion Breakers

Suitable emulsion breakers include, but are not limited to, dodecylbenzylsulfonic acid (DDBSA), the sodium salt of xylenesulfonic acid (NAXSA), epoxylated and propoxylated compounds, anionic cationic and nonionic surfactants, and resins, such as phenolic and epoxide resins.

(l) Hydrogen Sulfide Scavengers

Suitable additional hydrogen sulfide scavengers include, but are not limited to, oxidants (e.g., inorganic peroxides such as sodium peroxide or chlorine dioxide); aldehydes (e.g., of 1-10 carbons such as formaldehyde, glyoxal, glutaraldehyde, acrolein, or methacrolein; and triazines (e.g., monoethanolamine triazine, monomethylamine triazine, and triazines from multiple amines or mixtures thereof).

(m) Gas Hydrate Inhibitors

Suitable gas hydrate inhibitors include, but are not limited to, thermodynamic hydrate inhibitors (THI), kinetic hydrate inhibitors (KHI), and anti-agglomerates (AA). Suitable thermodynamic hydrate inhibitors include, but are not limited to, sodium chloride, potassium chloride, calcium chloride, magnesium chloride, sodium bromide, formate brines (e.g. potassium formate), polyols (such as glucose, sucrose, fructose, maltose, lactose, gluconate, monoethylene glycol, diethylene glycol, triethylene glycol, mono-propylene glycol, dipropylene glycol, tripropylene glycols, tetrapropylene glycol, monobutylene glycol, dibutylene glycol, tributylene glycol, glycerol, diglycerol, triglycerol, and sugar alcohols (e.g. sorbitol, mannitol)), methanol, propanol, ethanol, glycol ethers (such as diethyleneglycol monomethylether, ethyleneglycol monobutylether), and alkyl or cyclic esters of alcohols (such as ethyl lactate, butyl lactate, methylethyl benzoate).

Suitable kinetic hydrate inhibitors and anti-agglomerates include, but are not limited to, polymers and copolymers, polysaccharides (such as hydroxyethylcellulose (HEC), carboxymethylcellulose (CMC), starch, starch derivatives, and xanthan), lactams (such as polyvinylcaprolactam, polyvinyl lactam), pyrrolidones (such as polyvinyl pyrrolidone of various molecular weights), surfactants (such as fatty acid salts, ethoxylated alcohols, propoxylated alcohols, sorbitan esters, ethoxylated sorbitan esters, polyglycerol esters of fatty acids, alkyl glucosides, alkyl polyglucosides, alkyl sulfates, alkyl sulfonates, alkyl ester sulfonates, alkyl aromatic sulfonates, alkyl betaine, alkyl amido betaines), hydrocarbon based dispersants (such as lignosulfonates, iminodisuccinates, polyaspartates), amino acids, and proteins.

(n) Biocides

Suitable biocides include, but are not limited to, oxidizing and non-oxidizing biocides. Suitable non-oxidizing biocides include, for example, aldehydes (e.g., formaldehyde, glutaraldehyde, and acrolein), amine-type compounds (e.g., quaternary amine compounds and cocodiamine), halogenated compounds (e.g., 2-bromo-2-nitropropane-3-diol (Bronopol) and 2-2-dibromo-3-nitrilopropionamide (DB-NPA)), sulfur compounds (e.g., isothiazolone, carbamates, and metronidazole), and quaternary phosphonium salts (e.g., tetrakis(hydroxymethyl)-phosphonium sulfate (THPS)). Suitable oxidizing biocides include, for example, sodium hypochlorite, trichloroisocyanuric acids, dichloroisocyanuric acid, calcium hypochlorite, lithium hypochlorite, chlorinated hydantoins, stabilized sodium hypobromite, activated sodium bromide, brominated hydantoins, chlorine dioxide, ozone, and peroxides.

(o) pH Modifiers

Suitable pH modifiers include, but are not limited to, alkali hydroxides, alkali carbonates, alkali bicarbonates, alkaline earth metal hydroxides, alkaline earth metal carbonates, alkaline earth metal bicarbonates and mixtures or combinations thereof. Exemplary pH modifiers include sodium hydroxide, potassium hydroxide, calcium hydroxide, calcium oxide, sodium carbonate, potassium carbonate, sodium bicarbonate, potassium bicarbonate, magnesium oxide, and magnesium hydroxide.

(p) Surfactants

Suitable surfactants include, but are not limited to, anionic surfactants, cationic surfactants, and nonionic surfactants. Anionic surfactants include alkyl aryl sulfonates, olefin sulfonates, paraffin sulfonates, alcohol sulfates, alcohol ether sulfates, alkyl carboxylates and alkyl ether carboxylates, and alkyl and ethoxylated alkyl phosphate esters, and mono and dialkyl sulfosuccinates and sulfosuccinamates. Cationic surfactants include alkyl trimethyl quaternary ammonium salts, alkyl dimethyl benzyl quaternary ammonium salts, dialkyl dimethyl quaternary ammonium salts, and imidazolinium salts. Nonionic surfactants include alcohol alkoxylates, alkylphenol alkoxylates, block copolymers of ethylene, propylene and butylene oxides, alkyl dimethyl amine oxides, alkyl-bis(2-hydroxyethyl) amine oxides, alkyl amidopropyl dimethyl amine oxides, alkylamidopropyl-bis (2-hydroxyethyl) amine oxides, alkyl polyglucosides, polyalkoxylated glycerides, sorbitan esters and polyalkoxylated sorbitan esters, and alkyl polyethylene glycol esters and diesters. Also included are betaines and sultanes, amphoteric surfactants such as alkyl amphoacetates and amphodiacetates, alkyl amphopropionates and amphodipropionates, and alkyliminodiproprionate.

The surfactant can be a quaternary ammonium compound, an amine oxide, an ionic or nonionic surfactant, or any combination thereof. Suitable quaternary amine compounds include, but are not limited to, alkyl benzyl ammonium chloride, benzyl cocoalkyl($C_{12}$-$C_{18}$)dimethylammonium chloride, dicocoalkyl ($C_{12}$-$C_{18}$)dimethylammonium chloride, ditallow dimethylammonium chloride, di(hydrogenated tallow alkyl)dimethyl quaternary ammonium methyl chloride, methyl bis(2-hydroxyethyl cocoalkyl($C_{12}$-$C_{18}$) quaternary ammonium chloride, dimethyl(2-ethyl) tallow ammonium methyl sulfate, n-dodecylbenzyldimethylammonium chloride, n-octadecylbenzyldimethyl ammonium chloride, n-dodecyltrimethylammonium sulfate, soya alkyltrimethylammonium chloride, and hydrogenated tallow alkyl (2-ethylhexyl) dimethyl quaternary ammonium methyl sulfate.

(q) Additional Components

Compositions made according to the invention can further include additional functional agents or additives that provide a beneficial property. The amount of an additional agent or additive, when present, will vary according to the particular composition being manufactured and its intended use as one skilled in the art will appreciate.

3. METHODS OF PREPARING THE COMPOSITIONS

Compositions of the invention can be prepared by combining a polyamine component and a sulfonic acid component to provide a polyamine sulfonic acid salt. To the polyamine sulfonic acid salt can be added one or more additional corrosion inhibitors, synergists, and/or solvents.

4. METHODS OF USE

The compositions of the invention can be used for inhibiting corrosion and/or removing hydrocarbonaceous deposits (e.g., schmoo) in oil and gas applications. The compositions can be used for inhibiting corrosion and/or removing hydrocarbonaceous deposits by treating a gas or liquid stream with an effective amount of a composition of the invention, as described herein. The compositions of the invention can be used in any industry where it is desirable to inhibit corrosion and/or remove hydrocarbonaceous deposits from a surface.

The cleaner/corrosion inhibitor compositions can be used in water systems, condensate/oil systems/gas systems, or any combination thereof. The compositions can be applied to a gas or liquid produced, or used in the production, transportation, storage, and/or separation of crude oil or natural gas. The compositions can be applied to a gas stream used or produced in a coal-fired process, such as a coal-fired power plant. The compositions can be applied to a gas or liquid produced or used in a waste-water process, a farm, a slaughter house, a land-fill, a municipality waste-water plant, a coking coal process, or a biofuel process.

A fluid to which the compounds and compositions can be introduced can be an aqueous medium. The aqueous medium can comprise water, gas, and optionally liquid hydrocarbon. A fluid to which the compounds and compositions can be introduced can be a liquid hydrocarbon. The liquid hydrocarbon can be any type of liquid hydrocarbon including, but not limited to, crude oil, heavy oil, processed residual oil, bituminous oil, coker oils, coker gas oils, fluid catalytic cracker feeds, gas oil, naphtha, fluid catalytic cracking slurry, diesel fuel, fuel oil, jet fuel, gasoline, and kerosene. The fluid or gas can be a refined hydrocarbon product.

A fluid or gas treated with a composition of the invention can be at any selected temperature, such as ambient temperature or an elevated temperature. The fluid (e.g., liquid hydrocarbon) or gas can be at a temperature of from about 40° C. to about 250° C. The fluid or gas can be at a temperature of from −50° C. to 300° C., 0° C. to 200° C., 10° C. to 100° C., or 20° C. to 90° C. The fluid or gas can be at a temperature of −50° C., −45° C., −40° C., −35° C., −30° C., −25° C., −20° C., −15° C., −10° C., −5° C., or 0° C. The fluid or gas can be found in an arctic environment, and can have a temperature and salinity typical of such environment.

The compositions of the invention can be added to a fluid at various levels of water cut. For example, the water cut can be from 0% to 100% volume/volume (v/v), from 1% to 80% v/v, or from 1% to 60% v/v. The fluid can be an aqueous medium that contains various levels of salinity. The fluid can have a salinity of 0% to 25%, about 1% to 24%, or about 10% to 25% weight/weight (w/w) total dissolved solids (TDS).

The fluid or gas in which the compositions of the invention are introduced can be contained in and/or exposed to many different types of apparatuses. For example, the fluid or gas can be contained in an apparatus that transports fluid or gas from one point to another, such as an oil and/or gas pipeline. The apparatus can be part of an oil and/or gas refinery, such as a pipeline, a separation vessel, a dehydration unit, or a gas line. The compositions can be introduced to large diameter flow lines of from about 1 inch to about 4 feet in diameter, small gathering lines, small flow lines and headers. The fluid can be contained in and/or exposed to an apparatus used in oil extraction and/or production, such as a wellhead. The apparatus can be part of a coal-fired power plant. The apparatus can be a scrubber (e.g., a wet flue gas desulfurizer, a spray dry absorber, a dry sorbent injector, a spray tower, a contact or bubble tower, or the like). The apparatus can be a cargo vessel, a storage vessel, a holding tank, or a pipeline connecting the tanks, vessels, or processing units. The fluid or gas can be contained in water systems, condensate/oil systems/gas systems, or any combination thereof.

The compositions of the invention can be introduced into a fluid or gas by any appropriate method for ensuring dispersal through the fluid or gas. The inhibitor composition can be added at a point in a flow line upstream from the point at which corrosion prevention and/or schmoo removal is desired. The compositions can be injected using mechanical equipment such as chemical injection pumps, piping tees, injection fittings, atomizers, quills, and the like. The compositions of the invention can be introduced with or without one or more additional polar or non-polar solvents depending upon the application and requirements.

The compositions of the invention can be pumped into an oil and/or gas pipeline using an umbilical line. A capillary injection systems can be used to deliver the compositions to a selected fluid. The compositions can be introduced into a liquid and mixed. The compositions can be injected into a gas stream as an aqueous or non-aqueous solution, mixture, or slurry. The fluid or gas can be passed through an absorption tower comprising a composition of the invention.

The compositions can be applied to a fluid or gas to provide any selected concentration. In practice, the compositions of the invention are typically added to a flow line to provide an effective treating dose of the described compositions from about 0.01 to about 5,000 ppm. The compositions can be applied to a fluid or gas to provide at a concentration of about 1 parts per million (ppm) to about 1,000,000 ppm, about 1 parts per million (ppm) to about 100,000 ppm, or about 10 ppm to about 75,000 ppm. The compositions can be applied to a fluid at a concentration of about 100 ppm to about 10,000 ppm, about 200 ppm to about 8,000 ppm, or about 500 ppm to about 6,000 ppm. The compositions can be applied to a fluid or gas to provide a concentration of 10 ppm, 20 ppm, 100 ppm, 200 ppm, 500 ppm, or 1,000 ppm. Each system can have its own requirements, and the effective amount of a composition to sufficiently reduce the rate of corrosion and/or remove schmoo can vary with the system in which it is used.

The compositions can be applied continuously, in batch, or a combination thereof. For example, the composition doses can be continuous to prevent corrosion or intermittent (i.e., batch treatment) to remove hydrocarbonaceous deposits. The composition doses can be continuous/maintained and/or intermittent to both inhibit corrosion and remove deposits. Dosage rates for continuous treatments typically range from about 10 to about 500 ppm, or about 10 to about 200 ppm. Dosage rates for batch treatments typically range from about 10 to about 400,000 ppm, or about 10 to about 20,000 ppm. The composition can also be applied as a pill to a pipeline, providing a high dose (e.g., 20,000 ppm) of the composition.

The flow rate of a flow line in which the composition is used can be between 0 and 100 feet per second, or between 0.1 and 50 feet per second. The compositions can be formulated with water in order to facilitate addition to the flow line.

The compositions, methods, and processes of the invention will be better understood by reference to the following examples, which are intended as an illustration of and not a limitation upon the scope of the invention.

5. EXAMPLES

The foregoing can be better understood by reference to the following examples, which are presented for purposes of illustration and are not intended to limit the scope of the invention.

Example 1

Cleaner/Corrosion Inhibitor Composition

Table 1 summarizes an exemplary composition of the invention ("Example 1"). The composition includes 35 wt. % of a polyamine sulfonic acid salt component formed from 20 wt. % of a polyamine component (Ethyleneamine E-100; Huntsman Corporation) and 15 wt. % of a sulfonic acid component (dodecylbenzenesulfonic acid), based on total weight of the composition. The composition further includes a synergist and a solvent. The synergist is 2-mercaptoethanol and is present in an amount of 8 wt. % based on total weight of the composition. The solvent is methanol and is present in an amount of 57 wt. % based on total weight of the composition.

The composition of Table 1 was prepared by combining Ethylene E-100 with dodecylbenzenesulfonic acid to provide a polyamine dodecylbenzenesulfonic acid salt. To the salt was added 2-mercaptoethanol and methanol.

TABLE 1

Composition of Example 1

| Component | | Amount (wt %) | Ex.1 (wt %) |
|---|---|---|---|
| Polyamine | Ethyleneamine E-100 | 100 | 20 |
| Sulfonic Acid | Linear dodecyl-benzenesulfonic acid | 100 | 15 |
| Synergist | 2-mercaptoethanol | 100 | 8 |
| Solvent | methanol | 100 | 57 |

Example 2

Cleaner/Corrosion Inhibitor Composition

Table 2 summarizes another exemplary composition of the invention ("Example 2"). The composition includes 35 wt. % of a polyamine sulfonic acid salt component formed from 20 wt. % of a polyamine component (Ethyleneamine E-100; Huntsman Corporation) and 15 wt. % of a sulfonic acid component (dodecylbenzenesulfonic acid), based on total weight of the composition. The composition further includes a corrosion inhibitor, a synergist, and a solvent. The corrosion inhibitor is present in an amount of 15 wt. % based on total weight of the composition, and consists of an imidazolinium salt, a pyridinium salt, and an ethoxylated alkyl amine. The synergist is 2-mercaptoethanol and is present in an amount of 8 wt. % based on total weight of the composition. The solvent is methanol and is present in an amount of 42 wt. % based on total weight of the composition.

The composition of Table 2 was prepared by combining Ethylene E-100 with dodecylbenzenesulfonic acid to provide a polyamine dodecylbenzenesulfonic acid salt. To the salt was added the corrosion inhibitor, followed by 2-mercaptoethanol, and methanol.

TABLE 2

Composition of Example 2

| Component | | Amount (wt %) | Ex.2 (wt %) |
|---|---|---|---|
| Polyamine | Ethyleneamine E-100 | 100 | 20 |
| Sulfonic Acid | linear dodecyl-benzenesulfonic acid | 100 | 15 |
| Corrosion Inhibitor | imidazolinium salt | 10-50 | 15 |
| | pyridinium salt | 10-50 | |
| | ethoxylated alkyl amine | 10-50 | |
| Synergist | 2-mercaptoethanol | 100 | 8 |
| Solvent | methanol | 100 | 42 |

Example 3

Corrosion Performance Evaluation Via Bubble Test

The compositions of Examples 1 and 2 were evaluated for corrosion performance via a bubble test procedure. The bubble test simulates low flow areas where little or no mixing of water and oil occurs. The test was conducted using synthetic brine and field crude oil. The ratio of water to oil was 90:10. The brine was placed into kettles and purged with carbon dioxide. The brine was continually purged with carbon dioxide to saturate the brine prior to starting the test. After the test began, the test cell was blanketed with carbon dioxide through the duration of the test to maintain saturation. The kettles were stirred at 150 revolutions per minute (rpm) for the duration of the test to maintain thermal equilibrium at 60° C. The corrosion rate was measured by Linear Polarization Resistance (LPR) techniques. The working electrode used was 1018 carbon steel. The counter and reference electrodes were both 316 stainless steel. The electrodes were all cleaned and polished prior to testing. The kettles were dosed with the samples and a blank as described in Table 3. The results of the bubble test are shown in Table 3, as well as FIG. 1.

TABLE 3

| | | Bubble test results | | | | | | | | |
|---|---|---|---|---|---|---|---|---|---|---|
| | Dosage | 12 hrs after dosing | | | 18 hrs after dosing | | | End of testing | | |
| Chemical | (ppm) | mpy | mmpy | % P | mpy | mmpy | % P | mpy | mmpy | % P |
| Blank | 0 | 89.0 | 2.26 | N/A | 88.8 | 2.26 | N/A | 89.8 | 2.3 | N/A |
| Incumbent 1[a] | 20 | 1.5 | 0.04 | 98.3 | 1.51 | 0.04 | 98.3 | 1.45 | 0.04 | 98.4 |
| Incumbent 2[b] | 20 | 4.1 | 0.10 | 95.4 | 5.60 | 0.14 | 93.7 | 5.30 | 0.13 | 94.1 |
| Example 1[c] | 20 | 0.9 | 0.02 | 98.5 | 1.0 | 0.02 | 98.3 | 0.86 | 0.02 | 98.5 |
| Example 2[d] | 20 | 1.3 | 0.03 | 98.6 | 1.7 | 0.04 | 98.1 | 1.66 | 0.04 | 98.2 | ppm = parts per million; mpy = Mils per year, mmpy = millimeters per year; % P = percent protection
[a]Commercially available corrosion inhibitor comprising a blend of quaternary ammonium compounds, an imidazoline, and 2-mercaptoethanol;
[b]Commercially available corrosion inhibitor comprising a blend of quaternary ammonium compounds, an imidazoline and 2-mercaptoethanol.
[c]Composition of Example 1;
[d]Composition of Example 2.

Prior to dosage, the baseline corrosion rate was established in each kettle. Each sample was then added to the respective kettle and LPR measurements taken at 12, 18, and 20 hours later (end of testing). The untreated (blank) kettle showed very little change in corrosion rate during the test with a starting and ending corrosion rate of 89.0 and 89.8 mpy, respectively. All kettles that received chemical(s) demonstrated a reduction in corrosion compared to the baseline corrosion rate. Examples 1 and 2 showed equal or superior corrosion protection (>98%) compared to the incumbent commercial corrosion inhibitor/cleaner products when dosed at 20 ppm.

Example 4

Cleaning Performance Evaluation Via Flow Test

The composition of Example 2 was evaluated for cleaning performance. A flow test, known as a Dynamic Schmoo Removal Loop ("DSRL"), was set up to evaluate the efficacy of the composition at removing hydrocarbonaceous deposits from a pipeline steel surface under low flow conditions. Tests were conducted at 50, 100, 200, 500, and 1,000 ppm of composition in brine at 122° F.

The brine flowed through an acrylic-walled cell having internal dimensions of 20 mm side length and 40 mm height and having an inlet and outlet connection of about 3 mm internal diameter and 10 mm from the base on opposite sides of the cell. Brine flow through the cell was controlled with a peristaltic pump set at 1-liter every three minutes. A brine reservoir of about 400 mL was kept at 122° F., and the cell was placed on a stage and also held at 122° F.

A freshly polished 1018 mild steel coupon was placed in the empty cell with a known mass of schmoo (from an Alaskan pipeline source) applied to the coupon. The cell was filled with brine and circulation commenced for one hour. The coupon was then removed from the cell and air-dried and weighed. The coupons were also weighed after removing the remaining schmoo to normalize for coupon corrosion losses.

Figure 2:
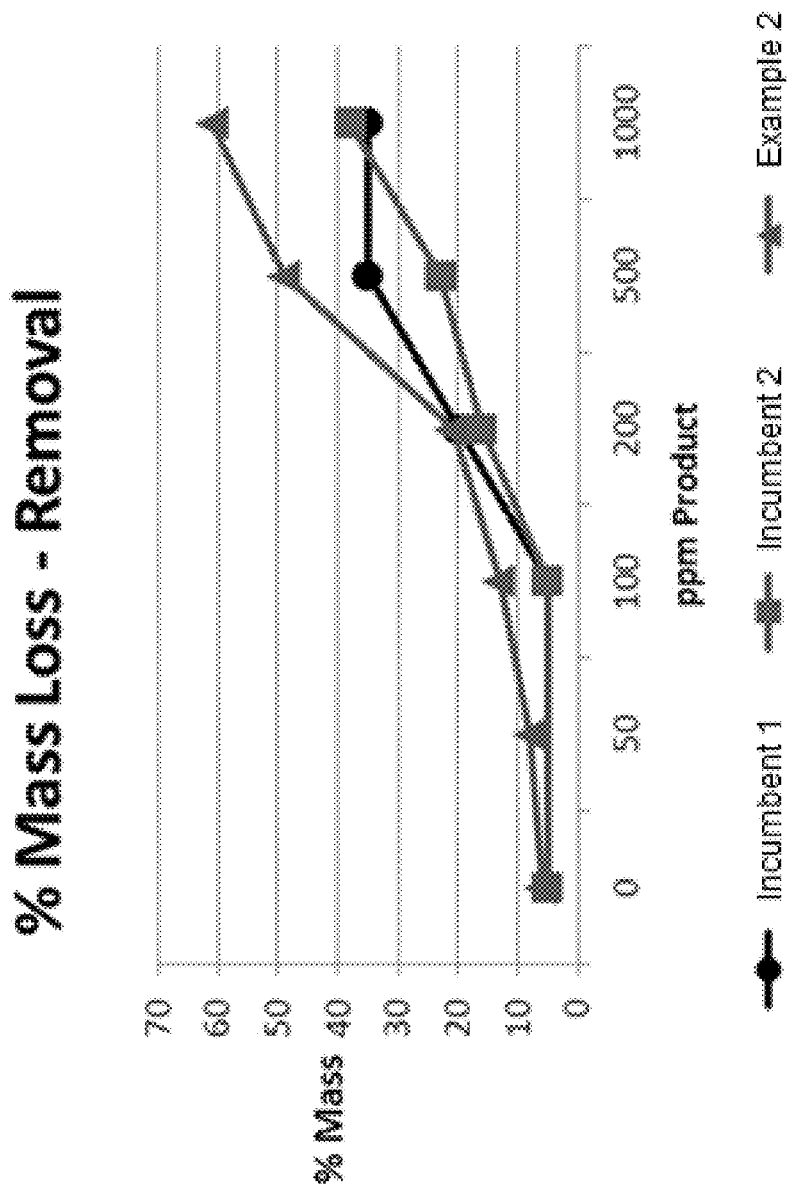
FIG. 2 is a graph of the % mass versus concentration of the composition.

Table 4 and FIG. 2 summarize the DSRL performance data. The composition of Example 2 unexpectedly showed 61% removal of mass from the test samples, whereas Incumbent 1 demonstrated 35% removal. Without being bound by theory, it is believed the unexpected superior cleaning performance can be a result of synergy of the dodecylbenzenesulfonic acid and polyamine to provide a polyamine salt composition (a cleaner) with reduced charge repulsion at treated surfaces (e.g., pipelines).

TABLE 4

| | Mass Removal Results | | |
|---|---|---|---|
| Dosage | % Schmoo Removal | | |
| (ppm) | Example 2 | Incumbent 1 | Incumbent 2 |
| 0 | 6 | 5 | 5 |
| 50 | 8 | | |
| 100 | 13 | 5 | 5 |
| 200 | 21 | 20 | 16 |
| 500 | 49 | 35 | 23 |
| 1000 | 61 | 35 | 38 |

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. Any and all patents, patent applications, scientific papers, and other references cited in this application, as well as any references cited therein, are hereby incorporated by reference in their entirety.

What is claimed is:

1. A composition for inhibiting corrosion and/or removing hydrocarbonaceous deposits in oil and gas applications, the composition comprising a polyamine sulfonic acid salt component and a corrosion inhibitor selected from the group consisting of:

(A) an imidazoline of Formula (I) or an imidazolinium salt of Formula (II):

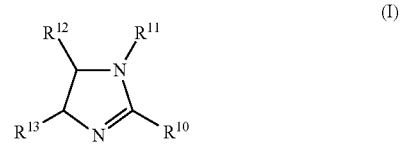

-continued

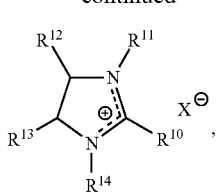

wherein
R¹⁰ is a $C_1$-$C_{20}$ alkyl or a $C_1$-$C_{20}$ alkoxyalkyl group;
R¹² and R¹³ are independently a $C_1$-$C_6$ alkyl group or hydrogen,
R¹¹ and R¹⁴ are independently hydrogen, $C_1$-$C_6$ alkyl, $C_1$-$C_6$ hydroxyalkyl, or $C_1$-$C_6$ arylalkyl; and
X⁻ is halide, chloride, bromide, iodide, carbonate, sulfonate, phosphate, or an anion of an organic carboxylic acid;
or a tautomer thereof;
(B) a compound of Formula (III):

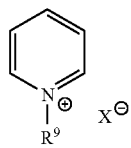

wherein
R⁹ is an alkyl group, an aryl group, or an arylalkyl group, wherein said alkyl groups have from 1 to about 18 carbon atom; and
X⁻ is chloride, bromide, or iodide; or
(C) an ethoxylated amine.

2. The composition of claim 1 wherein the polyamine sulfonic acid salt component is formed by reaction of a polyamine component with a sulfonic acid component.

3. The composition of claim 2, wherein the polyamine component comprises a polyalkylene polyamine, wherein the polyalkylene polyamine comprises a polyethylene polyamine, a polypropylene polyamine, a polybutylene polyamine, or a combination thereof.

4. The composition of claim 3, wherein the polyamine component comprises a mixture of tetraethylenepentamine (TEPA), pentaethylenehexamine (PEHA), and hexaethyleneheptamine (HEHA).

5. The composition of claim 2, wherein the sulfonic acid component is selected from the group consisting of an aryl sulfonic acid, an alkyl sulfonic acid, an arylalkyl sulfonic acid, and a combination thereof.

6. The composition of claim 1, wherein the polyamine sulfonic acid salt component comprises a salt selected from the group consisting of:
a tetraethylenepentamine dodecylbenzenesulfonic acid salt;
a pentaethylenehexamine dodecylbenzenesulfonic acid salt;
a hexaethyleneheptamine dodecylbenzenesulfonic acid salt;
and a combination thereof.

7. The composition of claim 1, wherein the corrosion inhibitor comprises the imidazoline of Formula (I) or the imidazolinium salt of Formula (II), R¹⁰ is an alkyl mixture typical in tall oil fatty acid (TOFA), R¹¹ is benzyl, R¹² and R¹³ are each hydrogen, R¹⁴ is hydroxyethyl, and X⁻ is chloride.

8. The composition of claim 1, wherein the corrosion inhibitor comprises the compound of Formula (III), R⁹ is benzyl, and X⁻ is chloride.

9. The composition of claim 1, wherein the corrosion inhibitor comprises the ethoxylated amine, and the ethoxylated amine is ethoxylated tallow amine.

10. The composition of claim 1 wherein the polyamine sulfonic acid salt component comprises at least one salt selected from a tetraethylenepentamine dodecylbenzenesulfonic acid salt, a pentaethylenehexamine dodecylbenzenesulfonic acid salt, and a hexaethyleneheptamine dodecylbenzenesulfonic acid salt;
the corrosion inhibitor comprises an imidazolinium salt, a pyridinium salt, or an ethoxylated alkyl amine; and
the composition further comprises methanol.

11. The composition of claim 10, wherein the polyamine sulfonic acid salt component comprises a mixture of a tetraethylenepentamine dodecylbenzenesulfonic acid salt, a pentaethylenehexamine dodecylbenzenesulfonic acid salt, and a hexaethyleneheptamine dodecylbenzenesulfonic acid salt.

12. The composition of claim 10, wherein the polyamine sulfonic acid salt component is present in an amount of 10-70 wt. %, the corrosion inhibitor component is present in an amount of 5-50 wt. %, and methanol is present in an amount of 10-80 wt. %, based on the total weight of the composition.

13. A method of inhibiting corrosion at a surface and/or removing hydrocarbonaceous deposits from a surface, the method comprising adding the composition of claim 1 to a fluid which contacts a surface of a wellbore or equipment used in production, processing, transportation, storage or separation of the fluid to inhibit corrosion and/or remove hydrocarbonaceous deposits from the surface, and the fluid comprising natural gas or a liquid hydrocarbon.

14. The method of claim 13 wherein the equipment comprises a pipeline, a storage vessel, downhole injection tubing, a flow line, or an injection line.

15. The method of claim 13 wherein the liquid hydrocarbon comprises crude oil, heavy oil, processed residual oil, bituminous oil, coker oil, gas oil, fluid catalytic cracker feed or slurry, naphtha, diesel fuel, fuel oil, jet fuel, gasoline, or kerosene.

16. The method of claim 13 wherein the polyamine sulfonic acid salt component comprises a salt selected from the group consisting of:
a tetraethylenepentamine dodecylbenzenesulfonic acid salt;
a pentaethylenehexamine dodecylbenzenesulfonic acid salt;
a hexaethyleneheptamine dodecylbenzenesulfonic acid salt;
and a combination thereof.

17. The method of claim 13, wherein an effective amount of the composition is provided at the surface when the composition provides at least 95% protection after 12 hours for a 1018 carbon steel working electrode in a bubble test, wherein the bubble test is characterized by:
(a) a testing temperature of about 60° C.;
(b) a carbon dioxide saturated liquid medium of 10% field crude oil and 90% synthetic brine; and
(c) an inhibitor dosage of 20 ppm of the composition based on total fluids.

18. The method of claim 13, wherein an effective amount of the composition is provided at the surface when the composition provides greater than or equal to 40% schmoo removal in a Dynamic Schmoo Removal Loop ("DSRL") test conducted at a dosage of 500 or 1,000 ppm of the composition in brine at 122° F.

19. A method of inhibiting corrosion at a surface and/or removing hydrocarbonaceous deposits from a surface, the method comprising adding the composition of claim 10 to a fluid which contacts a surface of a wellbore or equipment used in production, processing, transportation, storage or separation of the fluid to inhibit corrosion and/or remove hydrocarbonaceous deposits from the surface, and the fluid comprising natural gas or a liquid hydrocarbon.

20. The method of claim 19 wherein the equipment comprises a pipeline, a storage vessel, downhole injection tubing, a flow line, or an injection line; and the liquid hydrocarbon comprises crude oil, heavy oil, processed residual oil, bituminous oil, coker oil, gas oil, fluid catalytic cracker feed or slurry, naphtha, diesel fuel, fuel oil, jet fuel, gasoline, or kerosene.

* * * * *